United States Patent [19]

Mizuno et al.

[11] Patent Number: 5,441,802

[45] Date of Patent: Aug. 15, 1995

[54] BIAXIALLY-ORIENTED MULTI-LAYER FILMS

[75] Inventors: Hajime Mizuno; Hiroshi Omori, both of Yokkaichi, Japan

[73] Assignee: Mitsubishi Petrochemical Company Limited, Tokyo, Japan

[21] Appl. No.: 228,381

[22] Filed: Apr. 15, 1994

[30] Foreign Application Priority Data

Apr. 15, 1993 [JP] Japan .................... 5-088614

[51] Int. Cl.$^6$ .................... B32B 5/16; B32B 27/32
[52] U.S. Cl. .................... 428/327; 428/331; 428/332; 428/336; 428/347; 428/349; 428/516; 428/519; 428/520; 428/910
[58] Field of Search ............ 428/327, 331, 332, 336, 428/347, 349, 516, 519, 520, 910

[56] References Cited

U.S. PATENT DOCUMENTS

| | | | |
|---|---|---|---|
| 3,922,427 | 11/1975 | Toyoda et al. | 428/308 |
| 4,419,411 | 12/1983 | Park | 428/516 |
| 5,089,319 | 2/1992 | Bothe | 428/216 |
| 5,147,696 | 9/1992 | Lansbury et al. | 428/36.4 |

FOREIGN PATENT DOCUMENTS 2099754  12/1982  United Kingdom .

OTHER PUBLICATIONS

Derwent Publication Ltd., London GB, week 8540, Abstract No. 85-246476 JP60162645, Aug. 24, 1985.
Derwent Publications Ltd., London, GB, week 8746, Abstract No. 87-325684 JP62233248 Oct. 13, 1987.

*Primary Examiner*—D. S. Nakarani
*Attorney, Agent, or Firm*—Oblon, Spivak, McClelland, Maier, & Neustadt

[57] ABSTRACT

There is provided a biaxially-oriented multi-layer film comprising:
  a substrate layer comprising as a main component a crystalline propylene polymer; and
  a layer of a composition laminated on at least one surface of the substrate layer, the composition comprising the following components A, B and C:
    component A: 100 parts by weight of a propylene random copolymer,
    component B: 0.05 to 0.6 parts by weight of inorganic or organic fine particles having an average particle diameter of 0.5 to 5 μm, and
    component C: 0.5 to 10 parts by weight of a polypropylene modified with an acid, having a number-average molecular weight of 800 to 20,000.

5 Claims, No Drawings

BIAXIALLY-ORIENTED MULTI-LAYER FILMS

BACKGROUND OF THE INVENTION

1. Field of the Invention

This invention relates to biaxially-oriented multi-layer films, and more particularly to biaxially-oriented multi-layer films which have excellent transparency and low-temperature heat-sealing properties, and which are suited for high-speed automatic packaging.

2. Background Art

Biaxially-oriented multi-layer films such as a biaxially-oriented polypropylene film laminated with a heat-sealing layer, are excellent in various properties such as transparency and rigidity, so that they have been widely used as overwrap-packaging films for foods, tobaccos, cassette tapes, and the like. Because of the recent developments in high-speed automatic packaging machines, quality requirements for suitability of the films for automatic packaging are becoming severer.

The most important properties required for overwrap-packaging films are low-temperature heat-sealing properties. In order to impart good low-temperature heat sealability to the films, there has been developed a method in which a layer of a resin having excellent low-temperature heat-sealing properties, such as a propylene-ethylene random copolymer resin or a propylene-ethylene-butene-1 random copolymer resin, is laminated on a biaxially-oriented polypropylene film. Further, a significant improvement in the low-temperature heat-sealing properties has been made by adding a second component such as polybutene-1 to the above resin layer.

Moreover, in order to meet the recent trend toward high-speed packaging and improve suitability of the films for high-speed packaging by improving the antiblocking properties of the films, there has been proposed a method in which inorganic fine particles such as of silica or calcium carbonate are added to the above-described resin (Japanese Patent Publication No. 30347/1992); and a method in which organic fine particles such as spherical powder of a silicone resin are added to the above-described resin (Japanese Laid-Open Patent Publication No. 233248/1987).

However, a biaxially-oriented multi-layer film which is prepared by laminating on the surface of a biaxially-oriented polypropylene film a layer of a resin having excellent low-temperature heat-sealing properties, containing inorganic or organic fine particles has been found to have the drawback that when high-speed automatic packaging is conducted with the film for a long period of time, the packaging machine used suffers from staining with the fine particles that fell off the film.

Accordingly, an object of the present invention is to provide biaxially-oriented multi-layer films which have excellent transparency and low-temperature heat-sealing properties and have good suitability for high-speed automatic packaging, and which is free from the trouble of staining on packaging machines.

SUMMARY OF THE INVENTION

It has been found by the present inventors that the above object can be attained by utilizing inorganic or organic fine particles having a specific particle diameter in a specific amount and a low molecular-weight polypropylene modified with an acid. The present invention has been accomplished based on this finding.

Thus, the biaxially-oriented multi-layer film of the present invention comprises a substrate layer comprising as a main component a crystalline propylene polymer; and a layer of a composition laminated on at least one surface of the substrate layer, the composition comprising the following components A, B and C:

- component A: 100 parts by weight of a propylene random copolymer,
- component B: 0.05 to 0.6 parts by weight of inorganic or organic fine particles having an average particle diameter of 0.5 to 5 $\mu$m, and
- component C: 0.5 to 10 parts by weight of a polypropylene modified with an acid, having a number-average molecular weight of 800 to 20,000.

A biaxially-oriented multi-layer film of the present invention is excellent in transparency and low-temperature heat-sealing properties, and is suited for high-speed automatic packaging. In addition, even when high-speed automatic packaging is conducted with the film for a long period of time, the fine particles contained in the film do not fall off the film, causing no staining on the packaging machine used. The biaxially-oriented multi-layer film according to the present invention is thus very advantageous in industrial use.

DETAILED DESCRIPTION OF THE INVENTION

[I] Biaxially-Oriented Multi-Layer Films

The biaxially-oriented multi-layer film of the present invention comprises a substrate layer comprising as a main component a crystalline propylene polymer and a surface layer of a composition laminated on at least one surface of the substrate layer, the composition comprising the below-described components A, B and C.

(1) Substrate layer (a) Crystalline propylene polymer (essential component)

A crystalline propylene polymer which is used for the substrate layer of the biaxially-oriented multi-layer film of the present invention is a propylene homopolymer; or a random, block or graft polymer of propylene with a minor amount of other $\alpha$-olefin (ethylene, butene, hexene, 4-methylpentene, octene or the like), unsaturated carboxylic acid or a derivative thereof (acrylic acid, maleic anhydride or the like), or an aromatic vinyl monomer (styrene or the like).

The isotactic index (I.I) of such a crystalline propylene polymer is preferably 40% or more, more preferably 60% or more, most preferably 80% or more. It is therefore most preferred to use a propylene homopolymer. In this case, it is advantageous to use one having an I.I of 90% or more, more preferably 95% or more, especially 98% or more, from the viewpoints of the toughness, the film deliverability at the film-delivery section of a packaging machine and the suitability for high-speed automatic packaging of the resulting film.

Further, crystalline propylene polymers having a melt flow rate (MFR) or 0.5 to 10 g/10 min, especially 1 to 5 g/10 min are preferred.

The crystalline propylene polymers can be used either singly or as a mixture of two or more polymers.

(b) Other components to be blended (optional components)

The substrate layer of the biaxially-oriented multi-layer film of the present invention can comprise, besides the above-described crystalline propylene polymer as a main component, other optional components in an amount of up to 30% by weight. Examples of such optional components include other thermoplastic polymers, for example, hydrocarbon polymers such as an ethylene polymer, a butene polymer, a petroleum resin, a terpene resin, a styrene resin, and hydrogenated products thereof.

Of course, the crystalline propylene polymer used for the substrate layer may also contain additives, for example, a stabilizer such as an antioxidant or a weathering agent, a processing aid, a colorant, an antistatic agent, a lubricant, an anti-blocking agent and the like.

It is preferred that an antistatic agent, among the above additives, be contained in the crystalline propylene polymer. Preferred antistatic agents are fatty acid esters of glycerol, alkylamines, adducts of an alkylamine with ethylene oxide, and fatty acid esters thereof. A film which is insufficiently imparted with antistatic properties acquires static electricity while it is running in packaging operations, so that such a film sometimes exhibits poor film-deliverability.

(2) Surface layer

The surface layer provided in the biaxially-oriented multi-layer film of the present invention, which is laminated on either one surface or both surfaces of the substrate layer, is formed of a resin composition comprising the following components A, B and C.

(a) Essential components

Component A: Propylene random copolymer

The propylene random copolymers used as component A may be non-crystalline propylene random copolymer resins such as a propylene-ethylene random copolymer and a propylene-ethylene-butene-1 random copolymer, generally having an isotactic index (I.I) of less than 80%, preferably less than 60%, more preferably less than 40%.

The propylene-ethylene random copolymer resin generally has an ethylene content of 2 to 10% by weight, preferably 3 to 8% by weight, most preferably 4 to 6% by weight. When the ethylene content of the propylene-ethylene random copolymer resin is lower than 2% by weight, the resulting film tends to have poor heat sealability. When the ethylene content is higher than 10% by weight, the resulting film tends to be sticky and to have low scratch resistance.

The above propylene-ethylene-butene-1 random copolymer resin generally has an ethylene content of 0.3 to 6% by weight, preferably 0.5 to 5% by weight, and more preferably 1 to 4% by weight, and it generally has a butene-1 content of 2 to 30% by weight, preferably 3 to 25% by weight, and more preferably 5 to 20% by weight. When the ethylene content or the butene-1 content of the propylene-ethylene-butene-1 random copolymer resin is lower than the above lower limit, the resulting film tends to have poor heat-sealing properties. When the ethylene content or the butene-1 content is higher than the above upper limit, the resulting film tends to be sticky and to have low scratch resistance.

These propylene random copolymer resins generally have a melt flow rate of 0.4 to 100 g/10 min, preferably 0.5 to 50 g/10 min, more preferably 1 to 20 g/10 min, most preferably 2 to 10 g/10 minutes.

Component B: Inorganic or organic fine particles

The fine particles used as component B are inorganic or organic fine particles having an average particle diameter of 0.5 to 5 µm, preferably 1 to 4 µm.

Examples of the inorganic fine particles include silica, zeolite, talc and kaoline. Of these, silica is preferably used.

Those inorganic fine particles which are spherical in shape are preferred because spherical ones have an excellent effect on improvement in suitability for packaging.

Examples of the organic fine particles include a non-melting type polysiloxane powder, a polyamide powder, an acrylic resin powder, and powder of a condensed-type resin having a triazine ring. Of these, a non-melting type polysiloxane powder and a cross-linked polymethyl methacrylate powder are preferred.

It is preferable to use those organic fine particles which are spherical in shape as in the case of the inorganic fine particles.

Inorganic or organic fine particles having an average particle diameter below the above lower limit cannot impart improved suitability for packaging to the resulting film. On the other hand, inorganic or organic fine particles having an average particle diameter larger than the above upper limit will lower the transparency of the resulting film, and will not sufficiently prevent the fine particles from falling off the film, even when the component C which will be described below is added.

Component C: Polypropylene modified with an acid

Used as component C is a polypropylene modified with an acid, having a number-average molecular weight of 800 to 20,000, preferably 1,000 to 18,000 (hereinafter being referred to simply as "an acid-modified low-molecular-weight PP").

When the number-average molecular weight of the acid-modified low-molecular-weight polypropylene is less than 800, it is difficult to prevent the fine particles from falling off the film. On the other hand, when the number-average molecular weight is in excess of 20,000, the resulting film has poor heat-sealing properties, and it is again difficult to prevent the fine particles from falling off the film.

The acid-modified low-molecular-weight PP is one which may be prepared by addition of an unsaturated carboxylic acid and/or an anhydride thereof, which will be described later, to a low-molecular-weight polypropylene having terminal double bonds, or by decreasing the molecular weight of an ordinary polypropylene modified with an acid, and in which at least a part of the polypropylene molecules preferably has an end modified with an acid.

A suitable acid-modified low-molecular-weight PP has a softening point of generally 130° to 170° C., preferably 140° to 160° C., and has an acid value of generally 3 to 80 mgKOH/g, preferably 10 to 60 mgKOH/g.

The above low-molecular-weight polypropylene having terminal double bonds should have 1 to 10, preferably 2 to 7 terminal double bonds per 1,000 carbon atoms. When the number of terminal double bonds contained in the polypropylene is smaller than the above lower limit, there is a likelihood that the intended modification with acid cannot be achieved. When the number of terminal double bonds is larger than the above upper limit, the resulting acid-modified low-molecular-weight PP tends to have poor heat resistance.

The above-described modification of the polypropylene with an acid is carried out by a melt-graft method, a solution-graft method, or the like. A melt-graft method is conducted generally at a reaction temperature of 100° to 270° C., preferably 130° to 240° C. for a reaction time of generally 0.5 to 30 hours, preferably 1 to 20 hours. In a solution-graft method, the polypropylene is completely dissolved in xylene, and then reacted with an unsaturated carboxylic acid and/or an anhydride thereof in the presence of a peroxide at a reaction temperature of generally 120° to 180° C., preferably 140° to 160° C. for a reaction time of generally 1 to 20 hours, preferably 3 to 15 hours. A precipitate is then obtained by using a large amount of acetone or the like.

It is desirable that the product obtained by the above modification with an acid contain generally from 0.01 to 20%, preferably from 0.05 to 15%, more preferably from 0.1 to 10% by weight of an unsaturated carboxylic acid and/or an anhydride thereof. A mixture of the acid-modified polypropylene with a non-modified polypropylene may also be used as long as it contains an unsaturated carboxylic acid and/or an anhydride thereof in the above amount.

An acid-modified low-molecular-weight PP, properly selected from commercially available ones can also be used.

Unsaturated carboxylic acid

Examples of the above-described unsaturated carboxylic acid include (meth)acrylic acid, maleic acid, fumaric acid and itaconic acid.

Anhydride of unsaturated carboxylic acid

Examples of the above-described anhydride of unsaturated carboxylic acid include maleic anhydride, itaconic anhydride, citraconic anhydride, allylsuccinic anhydride, and nadic anhydride.

Of these, maleic anhydride is preferably used.

(b) Other components (additional components)

In order to further improve the biaxially-oriented multi-layer film of the present invention, additional components other than the above-described essential components can also be incorporated into the surface layer of the film.

Low-temperature heat-sealing properties can be further improved, for example, when 5 to 45 parts by weight of a crystalline butene-1 polymer is added as an additional component to 100 parts by weight of the above component A. Examples of such a crystalline butene-1 polymer include a butene-1 homopolymer and a copolymer of butene-1 and other α-olefins, such as ethylene and propylene. It is preferred that the MFR at 180° to 300° C. of the copolymer be the same as, or higher than that of the above component A at the same temperature. This is because such a copolymer can impart improved transparency to the resulting film.

It is preferred to add an organic lubricant such as a silicone oil or silicone gum in order to improve the suitability for high-speed packaging of the film. Particularly preferred lubricants are a polydiorganosiloxane gum having a polymerization degree (n) of 3,500 to 8,000, and a silicone oil having a viscosity of 100 to 100,000 centistokes. Three lubricants are used generally in an amount of 0.1 to 1 part by weight for 100 parts by weight of the component A.

(c) Blending proportion for components A to C

The blending proportion for the components A, B and C is determined based on the propylene random copolymer.

Amount of component B:

The amount of the inorganic or organic fine particles to be blended, as the component B, with the above propylene random copolymer is from 0.05 to 0.6 parts by weight, preferably from 0.1 to 0.5 parts by weight for 100 parts by weight of the propylene random copolymer.

When the amount of the component B is less than 0.05 parts by weight, the resulting film has poor suitability for high-speed automatic packaging. On the other hand, when this amount is in excess of 0.6 parts by weight, not only the fine particles cannot be prevented from falling off the film, but also the resulting film has poor transparency.

Amount of component C:

The amount of the acid-modified low-molecular-weight PP to be blended, as the component C, with the propylene random copolymer is from 0.5 to 10 parts by weight, preferably from 2 to 7 parts by weight for 100 parts by weight of the propylene random copolymer.

When the amount of the component C is less than 0.5 parts by weight, the fine particles (component B) cannot be prevented from falling off the film. When this amount is in excess of 10 parts by weight, not only the resulting film has poor heat-sealing properties but also the production cost will be increased.

The fine particles as component B can be most effectively prevented from falling off the film by the addition of component C when the fine particles are in the form of spheres, i.e. the form which is most suited for providing the film with excellent suitability for high-speed automatic packaging.

(d) Preparation of surface-layer forming composition

The surface-layer forming composition which forms the surface layer of the biaxially-oriented multi-layer film of the present invention is preferably prepared by mixing the above components A, B and C in a mixer such as a Henschel mixer, a V blender or a ribbon blender, and then kneading the mixture in a kneader such as an extruder.

It is possible to use a masterbatch in which the components B and C are contained in larger amounts than the fixed ones. When molding is conducted, the masterbatch is supplied after it is diluted. It is advisable to avoid preparing a masterbatch containing the component B and a masterbatch containing the component C separately, and diluting the respective masterbatches upon molding since in this case the intended improvements cannot be sufficiently achieved.

(3) Thickness of the film

The thickness of the biaxially-oriented multi-layer film of the present invention varies depending upon the intended use thereof. However, the thickness of the film is generally in the range of 5 to 100 μm, preferably 10 to 60 μm. The proportion of the surface layer to the substrate layer is generally from 1 to 20%, preferably from 1.5 to 10%.

The thickness of the surface layer of the biaxially-oriented multi-layer film is generally from 0.2 to 3 μm, preferably from 0.3 to 1.5 μm, more preferably from 0.5 to 1 μm.

When the thickness of the surface layer is in excess of 3 μm, the resulting film tends to have poor suitability for packaging. When the thickness of the surface layer is less than 0.2 μm, there is a likelihood that the resulting film is not uniformly imparted with heat-sealing strength.

[II] Production of Biaxially-Oriented Multi-Layer Film (1) Lamination and orientation The biaxially-oriented multi-layer film of the present invention can be produced by laminating the surface layer on at least one surface of the substrate layer, and subjecting the resulting multi-layer film to orientation.

The lamination and orientation may preferably be conducted by co-extruding the crystalline propylene polymer (and the optional additives) for forming the substrate layer and the composition for forming the surface layer to form a laminated sheet, and then subjecting the sheet to biaxial orientation. In this case, the surface-layer forming composition can be readily laminated on the substrate layer as a uniform, thin layer.

It is also possible to melt-extrude the surface-layer forming composition onto a non-oriented or uniaxially-oriented substrate sheet, and then subjecting the resulting laminate to biaxial orientation, or to uniaxial orientation in the direction perpendicular to the direction of orientation of the substrate sheet.

As regards the biaxial orientation, the longitudinal orientation can be conducted by utilizing the difference between the peripheral speeds of two rollers. The film is longitudinally oriented generally by 3 to 8 times, preferably by 4 to 6 times, generally at a temperature of 90° to 140° C., preferably 105° to 135° C. The film is then oriented in the cross direction generally by 3 to 12 times, preferably 6 to 11 times in a tenter oven. In order to prevent the resulting film from thermal shrinkage upon heat sealing, it is desirable to subject the film to heat setting at 120° to 170° C. after the crosswise orientation.

(2) Other treatments

For improving printability, preventing the bleeding of the antistatic agent contained and for other purposes, the film may further be subjected to other treatments such as a corona discharge treatment.

[III] Intended Use

The biaxially-oriented multi-layer films according to the present invention have excellent transparency and low-temperature heat-sealing properties, and are free of the problem of staining on high-speed packaging machines. The films thus possess good suitability for high-speed automatic packaging, and can be widely used as overwrap-packaging films for foods, tobaccos, cassette tapes, etc.

The following examples further illustrate the present invention but are not intended to limit it. In the examples, the following measurements were carried out.
(1) MFR: measured in accordance with ASTM-D-1238, at a temperature of 230° C. under a load of 2.16 kg.
(2) Haze: measured in accordance with ASTM-D-1003.
(3) Suitability for packaging Tobacco boxes were packaged with a film at a rate of 300 boxes/min by using a packaging machine manufactured by Tokyo Automatic Machinery Works, Ltd. The suitability of the film for packaging was evaluated in terms of the following items.

(i) Heat sealability

After the packaging operation was completed, the degree of adhesion of the film at the sealed portions at the top and the bottom of the package was evaluated.

(ii) Staining on packaging machine

At 2,000-m running of the film, the amount of inorganic or organic fine particles (powder) deposited on the packaging machine was visually evaluated according to the following standard:
◯: no powder
Δ: some powder
✕: large amount of powder Example 1

A mixture of 90 parts by weight of powder of a crystalline propylene homopolymer having an MFR of 1.9 g/10 min and an I.I of 98%, 10 parts by weight of a hydrogenated terpene resin and 0.9 parts by weight of a fatty acid ester of polyoxyethylene alkylamine was prepared as a material for a substrate layer.

As a material for a surface layer was prepared a resin composition (hereinafter referred to as an α-layer resin) consisting of, as component A, a mixture of 90 parts by weight of a propylene-ethylene-butene-1 random copolymer resin having an ethylene content of 2% by weight, a butene-1 content of 12% by weight and an MFR of 5.0 g/10 min, and 10 parts by weight of a butene-1-ethylene random copolymer resin having an ethylene content of 5% by weight and an MFR of 5.0 g/10 min; as component B, 0.45 parts by weight of spherical silica having an average particle diameter of 2 μm; as component C, 3 parts by weight of a low-molecular-weight polypropylene modified with maleic anhydride, having a number-average molecular weight of 5,000 and an acid value of 50 mgKOH/g, which was obtained by modifying a low-molecular-weight polypropylene having 4.2 terminal double bonds per 1,000 carbon atoms with maleic anhydride; and a silicone oil having a viscosity of 10,000 centistokes.

Provided as a material for another layer was the same propylene-ethylene-butene-1 random copolymer resin (hereinafter referred to as a β-layer resin) as used in the above-described α-layer resin.

The crystalline polypropylene mixture for the substrate layer, and the above-described α-layer and β-layer resins were co-extruded through a three-layer die, using three extruders respectively having a diameter of 115 mm, 20 mm and 30 mm, whereby a laminated sheet composed of three layers, that is, the α-layer/the substrate layer/the β-layer with a thickness of 0.05 mm/1 mm/0.05 mm was obtained.

Subsequently, the laminated sheet was stretched by five times in the longitudinal direction at a temperature of 115° C. by utilizing the difference between the peripheral speeds of the rollers used, and the stretched sheet was then oriented by 10 times in the cross direction by subjecting it to orienting and heat-setting in a tenter oven at a temperature of 165° C. A biaxially-oriented three-layer film was thus obtained.

The thicknesses of the three layers of this film were 0.9 μm/20 μm/1.1 μm.

After the surface of the β-layer of this film was treated with a corona discharge, packaging of tobacco boxes with the film was conducted so that the surface treated with a corona discharge would be the inner surface of the packages.

The results of the above described measurements are shown in Table 1.

EXAMPLE 2

The procedure of Example 1 was repeated except that the component B used in the α-layer resin was changed to 0.3 parts by weight of spherical polysiloxane powder having an average particle diameter of 3 μm, and the component C was changed to 5 parts by weight of a low-molecular-weight polypropylene modified with maleic anhydride, having a number-average molecular weight of 12,000 and an acid value of 30 mgKOH/g, which was prepared by modifying a low-molecular-weight polypropylene having 1.5 terminal double bonds per 1,000 carbon atoms with maleic anhydride. The results are shown in Table 1.

EXAMPLE 3

The procedure of Example 2 was repeated except that the component B used in the α-layer resin was changed to 0.2 parts by weight of a spherical crosslinked polymethyl methacrylate powder having an average particle diameter of 4 μm. The results are shown in Table 1.

Comparative Example 1

The procedure of Example 2 was repeated except that the component C used in the α-layer resin was not used. The results are shown in Table 1.

Comparative Example 2

The procedure of Example 2 was repeated except that the component C used in the α-layer resin was changed to 7 parts by weight of a low-molecular-weight polypropylene modified with maleic anhydride, having a number-average molecular weight of 23,000 and an acid value of 18 mgKOH/g, which was prepared by modifying a low-molecular-weight polypropylene having an MFR of 0.8/10 min. with benzoyl peroxide and maleic anhydride. The results are shown in Table 1.

What is claimed is:

1. A biaxially-oriented multi-layer film comprising:
   a substrate layer comprising as a main component a crystalline propylene polymer; and
   a layer of a composition laminated on at least one surface of the substrate layer, the composition comprising the following components A, B and C;
   component A: 100 parts by weight of a propylene random copolymer,
   component B: 0.05 to 0.6 parts by weight of inorganic or organic fine particles having an average particle diameter of 0.5 to 5 μm, and
   component C: 0.5 to 10 parts by weight of a polypropylene modified with an unsaturated carboxylic acid and/or an anhydride thereof, having a number-average molecular weight of 800 to 20,000, wherein said layer of said composition has a thickness of 0.2 to 3 μm.

2. The biaxially-oriented multi-layer film according to claim 1, wherein the crystalline propylene polymer is a propylene homopolymer; or a random, block or graft polymer of propylene with a minor amount of another α-olefin, an unsaturated carboxylic acid or a anhydride thereof, or an aromatic vinyl monomer.

3. The biaxially-oriented multi-layer film according to claim 1, wherein the propylene random copolymer is a propylene-ethylene random copolymer or a propylene-ethylene-butene-1 random copolymer.

4. The biaxially-oriented multi-layer film according to claim 1, wherein the inorganic or organic fine particles are of silica, a non-melting polysiloxane powder or a crosslinked polymethyl methacrylate powder.

5. The biaxially-oriented multi-layer film according to claim 1, wherein the polypropylene modified with an unsaturated carboxylic acid and/or an anhydride thereof is one in which at least a part of the polypropylene molecules has an end modified with an unsaturated carboxylic acid and/or an anhydride thereof.

* * * * *

TABLE 1

| Example No. | Inorganic or organic fine particles (Component B) | | | Low-molecular-weight PP modified with an acid (Component C) | | | | | Suitability for packaging | |
| --- | --- | --- | --- | --- | --- | --- | --- | --- | --- | --- |
| | Type | Average particle diameter (μm) | Amount added (parts by weight) | Modifier | Number-average molecular weight | Acid value (mg KOH/g) | Amount added (parts by weight) | Haze (%) | Heat-sealability (g/10 cm$^2$) | Staining |
| Example 1 | Spherical Silica | 2 | 0.45 | Maleic anhydride | 5,000 | 50 | 3 | 2.5 | Very good | ○ |
| Example 2 | Spherical polysiloxane | 3 | 0.30 | Maleic anhydride | 12,000 | 30 | 5 | 2.4 | Very good | ○ |
| Example 3 | Spherical polymethylmethacrylate | 4 | 0.20 | Maleic anhydride | 12,000 | 30 | 5 | 2.2 | Very good | ○ |
| Comparative Example 1 | Spherical polysiloxane | 3 | 0.30 | — | — | — | — | 2.2 | Very good | X |
| Comparative Example 2 | Spherical polysiloxane | 3 | 0.30 | Maleic anhydride | 23,000 | 18 | 7 | 2.8 | good | Δ |